United States Patent
Szajda

(10) Patent No.: US 11,182,509 B2
(45) Date of Patent: Nov. 23, 2021

(54) HARDWARE-BASED SYSTEM FOR CYBERSECURITY PROTECTION OF MICROPROCESSOR SYSTEMS

(71) Applicant: Trilicon LLC, Holliston, MA (US)

(72) Inventor: Kenneth Stanley Szajda, Holliston, MA (US)

(73) Assignee: Trilicon LLC, Holliston, MA (US)

(*) Notice: Subject to any disclaimer, the term of this patent is extended or adjusted under 35 U.S.C. 154(b) by 285 days.

(21) Appl. No.: 16/395,665

(22) Filed: Apr. 26, 2019

(65) Prior Publication Data

US 2019/0332819 A1 Oct. 31, 2019

Related U.S. Application Data

(60) Provisional application No. 62/664,189, filed on Apr. 29, 2018.

(51) Int. Cl.
| | | |
|---|---|---|
| G06F 21/72 | (2013.01) | |
| G06F 21/34 | (2013.01) | |
| G06F 21/62 | (2013.01) | |

(52) U.S. Cl.
CPC .......... *G06F 21/72* (2013.01); *G06F 21/34* (2013.01); *G06F 21/6209* (2013.01)

(58) Field of Classification Search
CPC ....... G06F 21/72; G06F 21/34; G06F 21/6209
See application file for complete search history.

(56) References Cited

U.S. PATENT DOCUMENTS

| 5,881,155 | A | 3/1999 | Rigal |
| 8,090,961 | B2 † | 1/2012 | Yoffe |
| 8,522,309 | B2 † | 8/2013 | Yoffe |
| 9,471,793 | B2 | 10/2016 | Gail et al. |
| 9,691,709 | B2 | 6/2017 | Leobandung |
| 10,050,959 | B2 * | 8/2018 | Soon-Shiong ........ H04L 9/3231 |
| 2011/0179482 | A1 * | 7/2011 | Yoffe ..................... G06F 21/82 |
| | | | 726/17 |

(Continued)

FOREIGN PATENT DOCUMENTS

WO 2017138773 A1 8/2017

*Primary Examiner* — Cheng-Feng Huang
(74) *Attorney, Agent, or Firm* — Clocktower Law LLC; Erik J. Heels; Michael A. Bartley

(57) ABSTRACT

A system for providing hardware-based cybersecurity for 'smart' devices includes a security device implemented without the use of microprocessors for critical security functions and an electrically separable device for removal or disconnection of certain security functions. The security device acts a security bridge between the microprocessor core(s) of the protected system and the rest of the protected system. The security device controls access to a protected storage area that holds microprocessor code and/or data for the protected system, and blocks or otherwise prevents execution of any code not present in the protected storage area. The electrically separable device is cryptographically matched to a single instance of a protected system and contains circuitry required to load, remove, or alter any information in the protected storage area. The electrically separable device can also be used for secure communication over a public network to and from the protected system.

13 Claims, 5 Drawing Sheets

(56) References Cited

U.S. PATENT DOCUMENTS

| | | | |
|---|---|---|---|
| 2012/0102334 A1* | 4/2012 | O'Loughlin | G06F 12/1408 |
| | | | 713/189 |
| 2013/0212671 A1* | 8/2013 | Wang | G06F 21/71 |
| | | | 726/16 |
| 2013/0340069 A1* | 12/2013 | Yoffe | G06F 21/30 |
| | | | 726/17 |
| 2014/0122901 A1* | 5/2014 | Bilke | G06F 21/6209 |
| | | | 713/193 |
| 2014/0223569 A1* | 8/2014 | Gail | G06F 21/00 |
| | | | 726/26 |
| 2014/0304780 A1* | 10/2014 | Kuang | H04L 63/0838 |
| | | | 726/4 |
| 2015/0074409 A1* | 3/2015 | Reid | G16H 10/60 |
| | | | 713/171 |
| 2016/0050225 A1 | 2/2016 | Carpenter et al. | |
| 2016/0072800 A1* | 3/2016 | Soon-Shiong | G16B 50/00 |
| | | | 726/7 |
| 2017/0041296 A1* | 2/2017 | Ford | G06F 16/951 |

\* cited by examiner  
† cited by third party

HARDWARE-BASED SYSTEM FOR CYBERSECURITY PROTECTION OF MICROPROCESSOR SYSTEMS

CROSS-REFERENCE TO RELATED APPLICATIONS

This utility patent application claims priority from U.S. provisional patent application Ser. No. 62/664,189, filed 2018 Apr. 29, titled "Hardware-Based System For Cybersecurity Protection Of Microprocessor Systems" and naming inventor Kenneth Stanley Szajda.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2019 Trilicon LLC.

BACKGROUND OF THE INVENTION

Field of the Invention

This invention relates to monitoring and protection of processor-based systems.

Background

The technology described herein is most broadly applicable in the embedded systems market where processor-based systems are used for specific purposes (as opposed to a general computation platform like a personal computer, tablet, or the like). Such systems cover a very wide range of end markets—generally, any market where one would find 'smart' devices. Such markets include "internet-of-things" (IoT) appliances, electronic medical devices, automated system control devices, mobile devices, automotive electronics, and the like. Underneath all these end markets are the embedded systems contained in the end product that are configured specifically for the end application. The technology described herein relates to those embedded systems.

Description of Prior Art

Patents

U.S. Pat. No. 5,881,155 "Security Device for a Semiconductor Chip" (Vincent Rigal 1999 Mar. 9) discloses, in the Abstract, "Security device for preventing access to confidential information stored in a semiconductor chip, or protected chip. The security device comprises a second semiconductor chip, or protective chip, with the two chips facing each other and being coupled to each other by communication terminals. The protected chip is coupled to external circuits via the protective chip, and the two semiconductor chips are separated by a semiconductor resin having a non-homogeneous electrical resistivity. The protective chip is provided with means for measuring a plurality of resistances through the semiconductor resin and with means for determining, at least from the measured resistances, an encryption key intended to be communicated to the protect chip to protect the confidential information." Rigal represents an early attempt at protecting digital information using a hardware approach for encryption, but does not provide for any level of system security other than encryption of information. In addition, the invention encoded encryption keys in a resistive resin that was incorporated into the semiconductor paging of the two chips involved (meaning, the encryption chip and the chip containing the encrypted data). The primary feature of Rigal is the storage of key information in the resin.

U.S. Pat. No. 9,471,793 "System on Chip with Embedded Security Module" (Markus Gail et. al. 2016 Oct. 18) discloses, in the Abstract, "An embedded security module includes a security processor, volatile and non-volatile memory, and an interface. The security processor includes transistors formed in one or more semiconductor layers of a semiconductor die, and implements one or more security-related functions on data and/or code accessed by the security processor. The volatile memory is fabricated on the same semiconductor die as the security processor and stores the data and/or code accessed by the security processor. The non-volatile memory includes non-volatile storage cells disposed above each semiconductor layer of the semiconductor die, and securely stores at least one of the data and/or code accessed by the security processor and security information relating to the data and/or code accessed by the security processor. The interface is fabricated on the same semiconductor die as the security processor and provides a communication interface for the security processor." This invention relates to the construction and use of a separate processor system for security functions.

U.S. Pat. No. 9,691,709 "Semiconductor Device Security" (Effendi Leobandung, 2017 Jun. 27) discloses, in the Abstract, "Semiconductor device security is provided as follows. A unique identification is generated by randomly forming a plurality of defects in one or more circuit elements of the semiconductor device. This method may yield a semiconductor device which is not susceptible to being replicated or cloned." This invention discloses a method that can be used to 'program' a unique identifier or key into a semiconductor chip that, it is claimed, is more area efficient than other commonly known and used methods. The invention described relates only to establishment of a unique key in a semiconductor chip using purposeful introduction of defects. As such, the invention relates to semiconductor processing and not to semiconductor system security. Leobandung may, for some systems, improve key creation and storage.

Patent Application Publications

U.S. Publication US20160050225 "Analyzing Cybersecurity Risk in an Industrial Control Environment" (Seth G. Carpenter et. al. 2016 Feb. 18) discloses, in the Abstract, "A method of analyzing cyber-security risks in an industrial control system (ICS) including a plurality of networked devices includes providing a processor and a memory storing a cyber-security algorithm. The processor runs the cyber-security algorithm and implements data collecting to compile security data including at least vulnerability data including cyber-risks (risks) regarding the plurality of networked devices by scanning the plurality of devices, processing the security data using a rules engine which associates a numerical score to each of the risks, aggregating data including ranking the risks across the plurality of networked devices and arranging the risks into at least one logical grouping, and displaying the logical grouping(s) on a user station." This invention is typical of the current state of the art in cybersecurity, namely, it pertains to the collection and analysis of data and the use of the data to assess risk, detect malicious activity, and provide alerts when irregular activity is detected. The major flaw with these approaches is that the software and hardware used in the implementation of the invention is itself subject to the same risks as the system being monitored. Furthermore, the analysis is based on heuristic algorithms and statistical analysis.

PCT Publication WO2017044446 "Cybersecurity System for a Vehicle" (Gregory S. Sweeney et. al 2017 Mar. 16) discloses, in the Abstract, "A method of providing cyber security for a vehicle includes monitoring, by a cyber security system of the vehicle, a plurality of parameters acquired from at least one communication bus of the vehicle. The parameters are filtered to identify parameters of interest for cyber security threat detection. An evaluation of the parameters of interest is performed with respect to one or more of normal conditions and abnormal conditions to identify at least one likely cyber security threat in the vehicle based on identifying at least one condition that does not match the normal conditions or at least one condition that does match the abnormal conditions. One or more recovery actions are triggered based on identifying the at least one likely cyber security threat in the vehicle." This invention describes a system for detecting anomalous behavior in a vehicle electronics system based on analysis and monitoring of the vehicle system bus.

PCT Publication WO2017138773 "Security Semiconductor Chip and Method for Operating Same" (Unknown, 2017 Aug. 17) discloses, in a translation of the Abstract, "A security semiconductor chip is presented. Semiconductor chips can detect when there is a physical attack such as depackaging. According to one embodiment, the semiconductor chip includes an energy harvesting element in the package. Illustratively, the energy harvesting element may include an on-chip photodiode. A depackaging attack causes the voltage generation of the photodiode, so that physical state changes to the packaging can be detected." This invention relates to detection of physical attacks on a semiconductor chip, meaning, prevention of 'reverse engineering' of the chip contents by mechanically altering a packaged part, and does not relate to prevention of misuse of the chip itself. As such, the invention discusses a means by which the circuitry on a chip could detect intrusion into the chip package. In short, this application in no way provides any kind of protection for executable code or data and merely provides indication of tampering of the chip package.

As computing and processor-based systems have proliferated, so has the threat posed by intrusion into these systems. As indicated by the prior art, efforts have focused on detecting malicious intent in general purpose computing environments, akin to using a police force to identify and react to criminals lurking in a community. The present system is not based on that approach and is instead designed for protection of systems where intended function and purpose is known. Using the police analogy, it is the equivalent of using a bodyguard to protect a specific target, not a police force to protect a general population.

None of the prior art provides the comprehensive "bodyguard" system security that includes:
(1) complete hardware implementation of critical security functions (no reliance on software),
(2) both monitoring and control of the system processor busses and code stream,
(3) hardware that requires physical presence to enable certain security functions, and
(4) individual device identification via unique keys.

What is needed, therefore is a solution that overcomes the limitations in the prior art and embodies all these features.

The present invention can also optionally include (1) simultaneous hardware control of communications channels and (2) use of the physical presence device for pre-authenticated, mathematically secure communication to a remote location using standard communication channels. These additional features further strengthen security in systems where remote telemetry is desired.

BRIEF SUMMARY OF THE INVENTION

The present system is a semiconductor-based hardware security device that is used to provide code security for processor-based systems. Currently security approaches all target a general purpose, "personal-computer-like" model where systems are expected to have unfettered code access; the focus is on identifying malicious code, encryption of data (to make hacking more difficult), and compartmentalization of code (to try to limit the damage from malicious code). Every current approach falls into one of these categories.

Modern 'smart' devices have properties that differ substantially from the general-purpose model. The code running the devices is mostly static—the software is designed for a dedicated purpose and is (ideally) never updated; updates are limited to (hopefully infrequent) bug-fix updates or system upgrades. Network connectivity of the devices is provided for a limited purpose—usually data transfer/collection and/or coordination with a mobile device or remote monitor; connectivity is not intended for general purpose access.

The present system addresses security for this new usage model via a hardware-based security system. It consists of:
1. Dedicated special-purpose (non-CPU) hardware, separate from the system processor, for handling various security tasks;
2. Physically distinct hardware blocks, one of which could be removable or otherwise restricted, that communicate in a cryptographically secure way, and that can be used for assured authentication;
3. A key share system where keys are generated and stored only in hardware that is physically isolated from the CPU system, eliminating any possibility of malicious actor access via the protected system;
4. A protected code storage area that cannot be directly written from the protected system;
5. Unique cryptographically secure key shares as well as a common communications keys that are programmed on a per-system, per-unit basis, thus making every realization of the system cryptographically unique; and
6. A preferred embodiment that does not retain the primary key information anywhere in the device, eliminating the possibility of access via key theft.

In embedded systems, the code base is fixed, and access to CPU instructions can be limited to the known fixed code base. Unlike most security systems, there is no need to 'guess' to identify malicious code. In this system, the code base resides entirely within the protected storage area, so any attempt to access code outside of the protected storage area is immediately suspect and can be blocked at the physical (electrical) level.

FEATURES AND ADVANTAGES

The system combines several features not concurrently found in traditional implementations:

1. True hardware implementation: The clear majority of approaches to security are software-based; the few that are considered 'hardware-based' are just low-level software running on top of basic general-purpose hardware (as seen in the prior art). In other words, the basic security paradigm isn't any different, it's just partially implemented in hardware to improve performance metrics. In addition, existing hardware approaches focus primarily on network (communication) security, implement only hardware-based acceleration not full hardware function, and rely themselves on processors that can be compromised.

2. Semiconductor solution: Due to the difficulty of semiconductor implementation, current hardware approaches rely on general-purpose platforms. This system is based on custom integrated circuit design that is specific to its purpose and is not intended for any general computation. Successfully designing and building a modern integrated circuit requires both a depth and breadth of knowledge and experience that is not readily available in the marketplace.

3. Elimination of weak links: Current approaches that rely on standard implementations are subject to the vulnerabilities of those standards. For example, there are some well-known deficiencies in the Universal Serial Bus (USB) protocol, so any security method riding 'on top of' USB is at risk; the USB port itself has been used to compromise Intel-based processors. The present system implements provably secure hardware interfaces at the physical level, bypassing multi-layer protocols that serve no purpose other than to introduce weak points. (All security is provable over a set of assumptions (meaning, one must have a theoretical basis on which the security is provable). Throughout this document, the term 'provably secure' is used to denote provability under the contextual assumptions discussed.)

4. Exclusively physical-layer: The system doesn't rely on processors or other software-on-top-of-hardware approaches. The security system is codified in logic gates and state machines so that security is not dependent on software. Software is not part of the security function.

5. Design for dedicated-purpose systems: The system is general purpose in the sense that it is not tied to a single end use. However, it is designed specifically for systems that will ultimately have a defined, completely specified end use—meaning, the system being protected will be running dedicated code. Cybersecurity solutions today focus on a general-purpose solution where, in simplistic terms, security boils down to determining "good" code from "bad"—something that is provably impossible in the general case. The present system is designed to require physical access to the system to make any changes to the protected code base. (This does not preclude 'over the air' updates per se but for security purposes physical access would be needed for 'over the air' updates to be allowed to install and run on the system.) As a result, the security system 'knows' with certainty what code is considered "good" and will prevent any attempt to execute any other instructions.

The primary benefits of the system are:

1. Better protection: As the entire "internet-of-things" grows, smart devices are increasingly being used for system control and not just computation, which means that a security breakdown may involve more than just loss of data. Trilicon's technology provides better protection that eliminates system security failures in a world where the cost of an incident is rising. Malicious attacks can involve more than just financial loss as smart systems proliferate and are increasingly used in systems that can injure life or property.

2. Faster time to market: The system can be used across a wide range of embedded systems covering a plethora of smart devices. Because of this, smart system developers can easily employ the technology or can develop on systems that already incorporate the technology. This allows users to bring their products to market faster because it eliminates the need for them to develop their own security backbone. In regulated environments, the system can be 'pre-approved' which can accelerate regulatory approval of their product.

3. Lower costs: For most organizations, cybersecurity is a product requirement that often requires significant staffing, especially in critical markets such as the automotive or medical markets. With the expertise built into the system, there is no longer a need to dedicate resources to build platform expertise in-house. The system allows security to be 'baked in,' reducing staffing needs and reducing development costs.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF THE INVENTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Terminology

The terminology and definitions of the prior art are not necessarily consistent with the terminology and definitions of the current invention. Where there is a conflict, the following definitions apply.

CHIP means an electronic integrated circuit.

CODE means machine-language instructions used to control the actions of the microprocessor core(s) of the CPU SYSTEM.

CPU SYSTEM means one or more microprocessor cores and all other support devices and circuits of the microprocessor core(s).

CRYPTOGRAPHIC INFORMATION means any data associated with one or more functions of the SECURITY DEVICE. Such data includes, but is not limited to, encryption keys, identification keys, authentication keys, key shares, or hashes of any of these elements.

IC means an electronic integrated circuit that is implemented as either a CHIP or as SEMICONDUCTOR IP.

Figure 1:
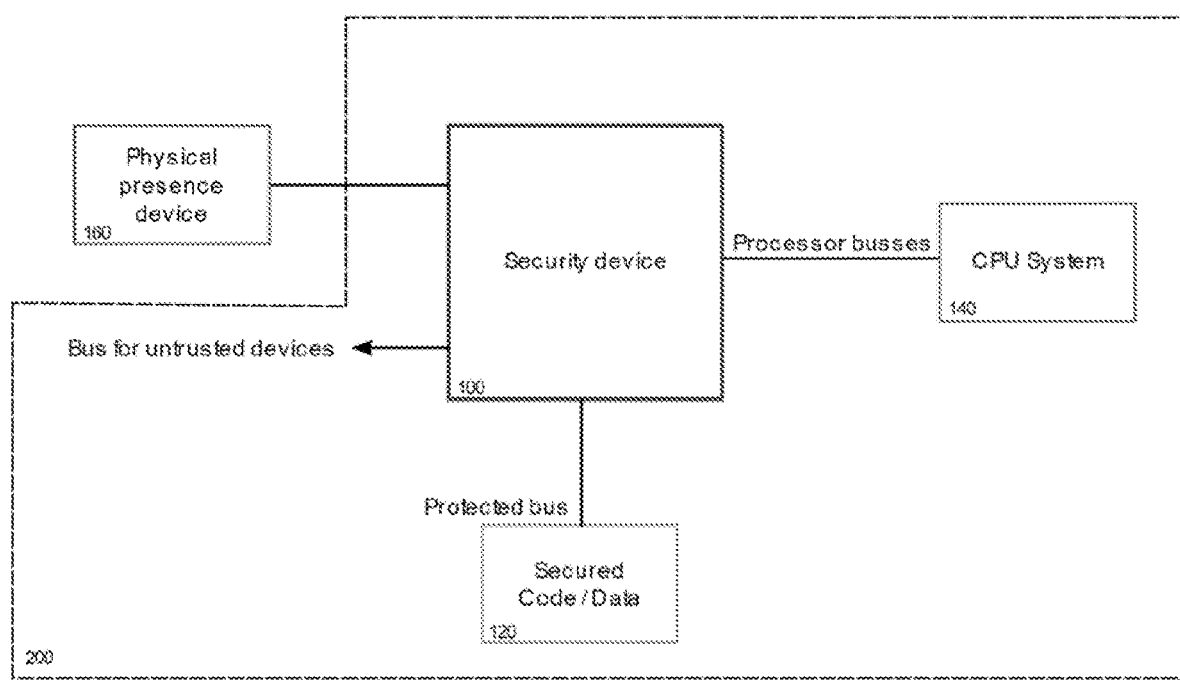
FIG. 1 is a drawing showing the protected system architecture when the physical presence device is engaged to allow loading of protected code or other restricted security actions.

PHYSICAL PRESENCE DEVICE (PPD) means an electrical circuit, possibly consisting of one or more CHIPs, that is capable of being electrically connected to a PROTECTED SYSTEM, for example shown as item 160 in FIG. 1.

PROGRAMMER means an electrical circuit or collection of circuits used to generate CRYPTOGRAPHIC INFORMATION that is stored on the SECURITY DEVICE and/or the PHYSICAL PRESENCE DEVICE.

PROTECTED SYSTEM means the system being protected, for example shown as item 200 in FIG. 1. It consists of the CPU SYSTEM and the SECURITY DEVICE.

SECURITY DEVICE means an electrical circuit, typically a CHIP or SEMICONDUCTOR IP, that is not removable from the PROTECTED SYSTEM. As part of its function it provides the only means of electrically connecting the PROTECTED SYSTEM to the PHYSICAL PRESENCE DEVICE or PROGRAMMER.

SEMICONDUCTOR IP means an electronic circuit that can be integrated on to a CHIP. This may consist of all representations of the circuit, including computer files of models, characterization data, geometric data, manufacturing data, or any other data representations attributable to the electronic circuit.

Operation

Embedded systems consist of microprocessor-based general computing platforms which run dedicated CODE (meaning, a fixed, pre-determined set of instructions for the microprocessor to execute). These systems differ from general computing systems in that the function(s) of the system is/are known and are well defined. An example of such a system would be a 'smart' thermostat that is meant to provide temperature regulation. These devices, especially when connected to a computer network (such as the internet), are subject to compromise by malicious actors attempting to interfere with normal function of the system. Many approaches have been used to prevent such intrusions, but these approaches all fail because they rely on the primary CPU SYSTEM for implementation of security functions. This reliance on the CPU SYSTEM means that the embedded system cannot know with certainty when it has been compromised, since an attacker controlling the CPU SYSTEM can alter the system to appear unthreatening.

The present system is implemented as a set of related electronic circuits consisting of a SECURITY DEVICE, a PHYSICAL PRESENCE DEVICE, and a PROGRAMMER. The SECURITY DEVICE and the PHYSICAL PRESENCE DEVICE would typically be constructed as CHIPS but could also be realized as SEMICONDUCTOR IP. There is no requirement that the SECURITY DEVICE and the PHYSICAL PRESENCE DEVICE are implemented using the same method; one could be a CHIP and one could be SEMICONDUCTOR IP without alteration of function.

The SECURITY DEVICE is a separate IC that is designed to act as a "bodyguard" for the CPU SYSTEM. It implements any number of security-related functions without any interaction with the main CPU SYSTEM microprocessor core(s) and without using general-purpose microprocessor core(s) of its own in the performance of its security functions. It is electrically connected to the processor via its standard interfaces (system bus, memory interfaces, and the like) and monitors electrical activity on the interfaces. It also controls access to protected storage (which is likely separate but electrically connected to the SECURITY DEVICE). A key feature is that its operation is in essence 'transparent' to the CPU SYSTEM in that any interactions with the primary microprocessor interfaces are examined and handled by it without the knowledge of the CPU SYSTEM.

When an instance of a PROTECTED SYSTEM is constructed, the PHYSICAL PRESENCE DEVICE and the SECURITY DEVICE associated with that instance both receive CRYPTOGRAPHIC INFORMATION from the PROGRAMMER. The CRYPTOGRAPHIC INFORMATION provided to the PPD is not necessarily the same as that provided to the SECURITY DEVICE. Once the PROGRAMMER has generated and transmitted the appropriate CRYPTOGRAPHIC INFORMATION to the PPD and the SECURITY DEVICE, the system instance is unique in that the PPD will only recognize the single instance of the SECURITY DEVICE and vice versa. A PPD from one instance cannot be used with another instance of the PROTECTED SYSTEM. Once this uniqueness is established, the PROGRAMMER is disconnected and is no longer needed for the instance. It discards any CRYPTOGRAPHIC INFORMATION that was generated. A single PROGRAMMER could be used repeatedly in this fashion to create additional unique instances of the PROTECTED SYSTEM.

Certain security functions are only electrically enabled when the PHYSICAL PRESENCE DEVICE is electrically connected to the PROTECTED SYSTEM. When the PPD is connected, the SECURITY DEVICE validates the device using some or all of the CRYPTOGRAPHIC INFORMATION stored on the SECURITY DEVICE. Once the SECURITY DEVICE determines that the PPD is the correct match for the specific instance of the PROTECTED SYSTEM, certain security functions are permitted. These functions involve one or more electrical circuits contained within the PPD to ensure that operations cannot be performed without the electrical connection and correct match of the PPD. Such functions may include, but are not limited to, encryption and loading of CODE or other data into the storage area protected by the SECURITY DEVICE; modification of SECURITY DEVICE state; or synchronization of some (but not all) of the CRYPTOGRAPHIC INFORMATION stored on either the PPD or the SECURITY DEVICE.

The key features of the system include: Electrical uniqueness of each instance of the PROTECTED SYSTEM via the use of the SECURITY DEVICE and the CRYPTOGRAPHIC INFORMATION stored within it; implementation of SECURITY DEVICE function entirely in hardware, without the use of general-purpose microprocessor core(s) in the performance of its security functions; and use of a PHYSICAL PRESENCE DEVICE to require direct "hands-on" interaction with the PROTECTED SYSTEM to enable certain security-related operations.

In normal operation, without the PHYSICAL PRESENCE DEVICE electrically connected to the system, the SECURITY DEVICE, as one of its primary functions, services all request, including CODE requests, for the microprocessor core(s). Requests from the microprocessor core(s) for CODE not contained in the storage area protected by the SECURITY DEVICE are identified as invalid requests and are handled in a manner that prevents the microprocessor from receiving any functional instructions. The invalid requests can be handled according to any number of methods not germane to the system, but in any event invalid requests will not result in the requested information being transmitted to the CPU SYSTEM for execution.

An additional feature of the present system is the ability of the PHYSICAL PRESENCE DEVICE to serve as a pre-authenticated device for communication with the PROTECTED SYSTEM. Because of the unique pairing of a PPD to a SECURITY DEVICE (and therefore a single instance of a PROTECTED SYSTEM), the PPD can use its CRYPTOGRAPHIC INFORMATION to establish a provably secure communications channel with its paired PROTECTED SYSTEM over a shared network. This is done by including electrical circuitry for an interface to a communication network (via any protocol such as Bluetooth, Ethernet, etc) on the PPD. When information is transmitted from the PROTECTED SYSTEM to the communication network, the SECURITY DEVICE modifies the transmitted data frame and encodes the frame payload using methods controlled by some of the CRYPTOGRAPHIC INFORMATION in its possession. Because the SECURITY DEVICE is modifying the transmitted data frame after the CPU SYSTEM has provided the fame data, the CPU SYSTEM is completely unaware that any modification has taken place. The modified data frame is sent over the communication network. Although the modified data frame could be detected and captured by any other devices on the network, the payload in the frame is encoded and cannot be read. When the PPD device is connected to the communication network, it can receive and decode the encoded payload because it has the requisite CRYPTOGRAPHIC INFORMATION stored. In systems where remote monitoring is useful, this feature provides a simple means of secure point-to-point communication over a possibly shared network. Because no authentication step is required before establishing communication, there is no risk to common interference predicated on a malicious actor pretending to be one of the parties to the communication (so called 'man in the middle' attacks).

Figure 2:
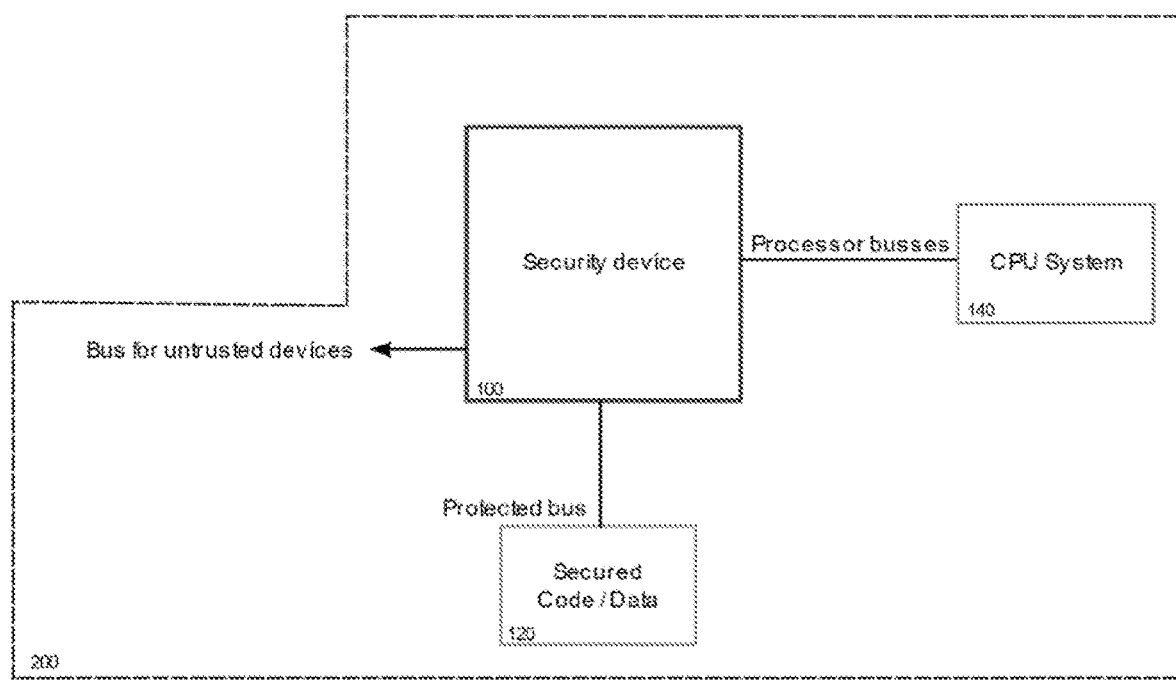
FIG. 2 is a drawing of the protected system under normal operation.
Figure 3:
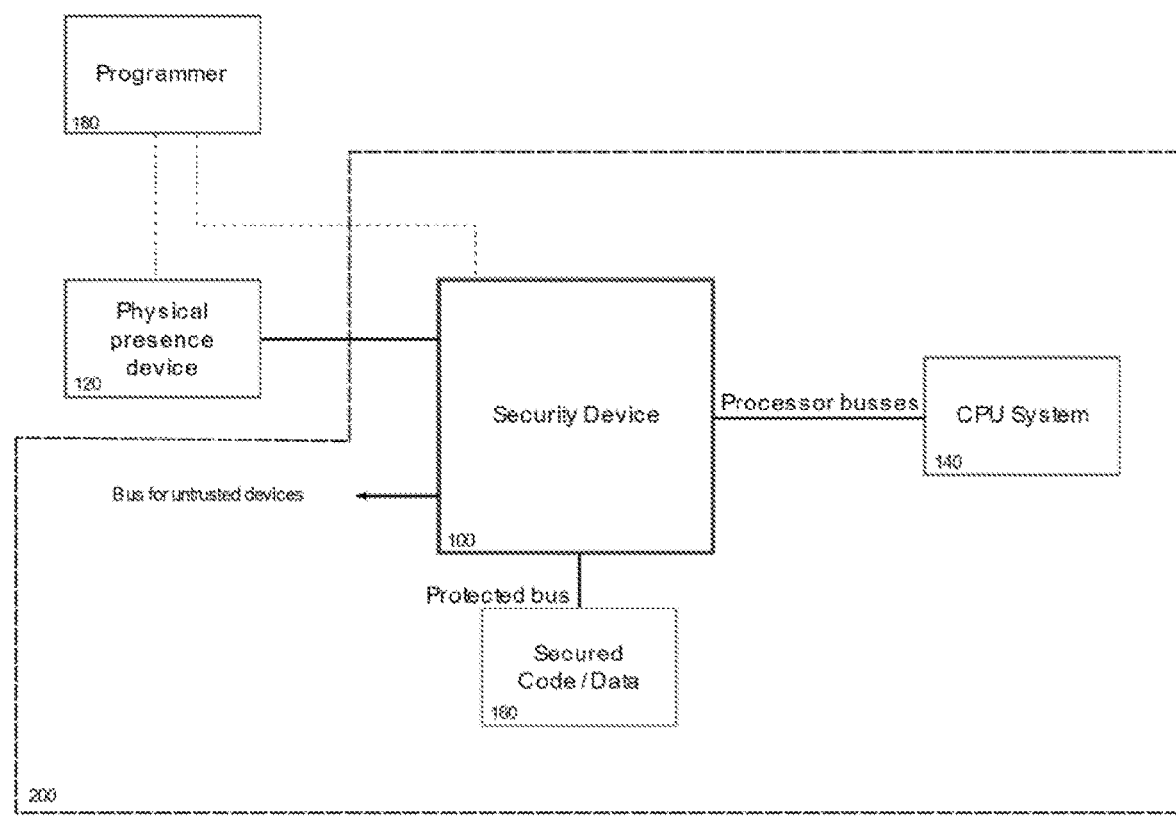
FIG. 3 is a drawing of the system configuration during initial programming.

The preferred embodiment is shown in FIG. 1, FIG. 2, and FIG. 3. In all three figures, the collection of elements 200 is the PROTECTED SYSTEM consisting of the SECURITY DEVICE 100 connected to and monitoring the interfaces of the CPU SYSTEM 140 and connected to and managing storage area 120.

FIG. 2 shows the PROTECTED SYSTEM under normal operating conditions. SECURITY DEVICE 100 monitors interfaces from and acts as a "bodyguard" for CPU SYSTEM 140. The system CODE is secured in storage area 120. CPU SYSTEM 140 does not have direct contact with the storage area and can only execute CODE passed to it from SECURITY DEVICE 100. Other devices that would ordinarily be connected directly to the bus or busses of CPU SYSTEM 140 are instead connected to SECURITY DEVICE 100. In FIG. 2 the system consists of SECURITY DEVICE 100 but may also include storage area 120.

FIG. 1 consists of the same PROTECTED SYSTEM 200 described above, with the same function described above. FIG. 1 also includes PHYSICAL PRESENCE DEVICE 160 that is electrically and mechanically connected to SECURITY DEVICE 100 inside PROTECTED SYSTEM 200. In this configuration, SECURITY DEVICE 100 detects and verifies the presence of PHYSICAL PRESENCE DEVICE 160 and, as a result, allows certain restricted operations to take place within SECURITY DEVICE 100. These operations rely, in part, on electrical circuits contained on PHYSICAL PRESENCE DEVICE 160, guaranteeing that these restricted operations cannot take place without PHYSICAL PRESENCE DEVICE 160. This configuration allows for the loading of information into storage area 120.

FIG. 3 consists of the same PROTECTED SYSTEM 200 described above but shows the system configuration during initial programming. PROGRAMMER 180 is electrically connected to SECURITY DEVICE 100 and PHYSICAL PRESENCE DEVICE 120. When connected, and with proper validation of the connection, PROGRAMMER 180 generates CRYPTOGRAPHIC INFORMATION unique to the particular system instance and stores one set of CRYPTOGRAPHIC INFORMATION on SECURITY DEVICE 100 and another set on PHYSICAL PRESENCE DEVICE 120. PROGRAMMER 180 generates and stores CRYPTOGRAPHIC INFORMATION necessary for PHYSICAL PRESENCE DEVICE 120 and SECURITY DEVICE 100 to uniquely identify each other, so that other instances of PROTECTED SYSTEM 200 cannot share the same PHYSICAL PRESENCE DEVICE.

Figure 4:
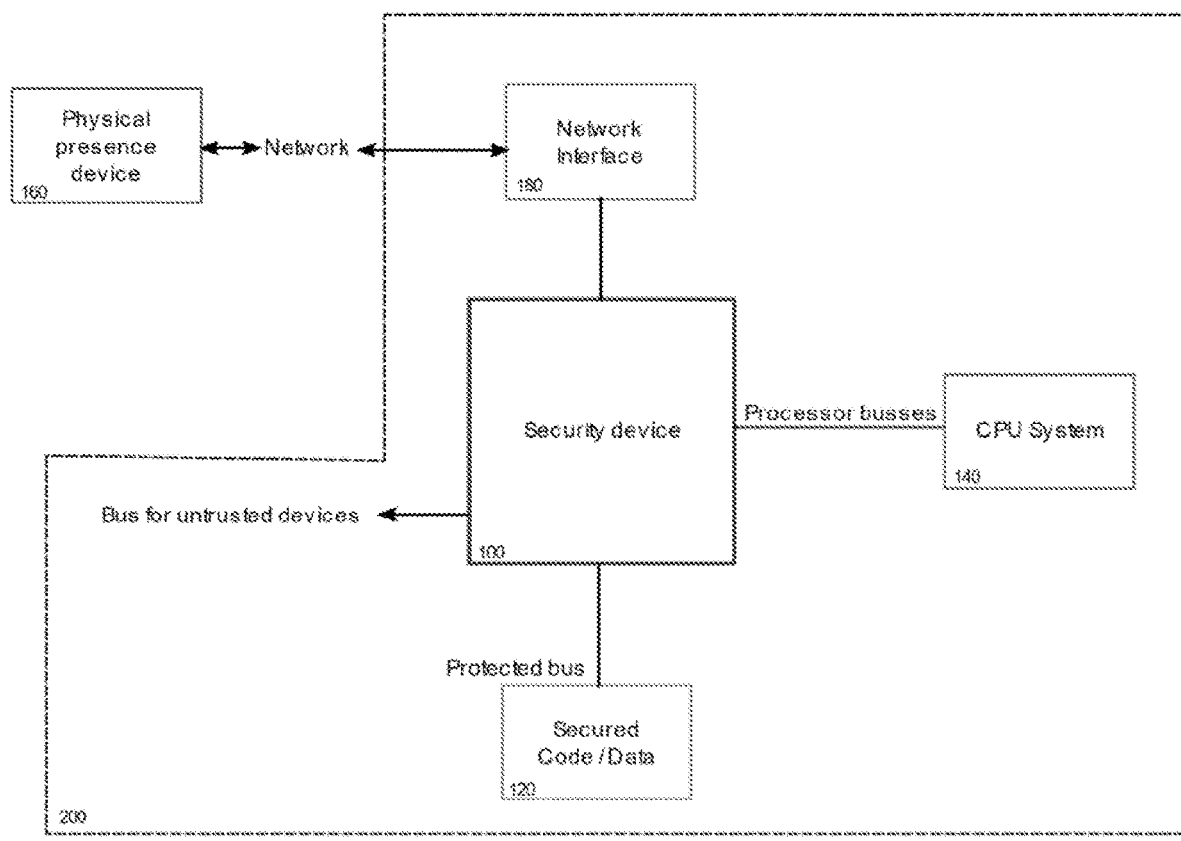
FIG. 4 is a drawing of the system showing network connectivity when the network interface is not part of the CPU system.

FIG. 4 shows the means by which SECURITY DEVICE 100 acts on communications from CPU SYSTEM 140 when a network interface is not directly a part of CPU SYSTEM 140. In this case, SECURITY DEVICE 100 intercepts all network traffic, extracts the data payload from a network frame, encodes the payload, reconstructs the frame with the encoded payload, and sends the modified frame to NETWORK INTERFACE 180 for transmission. Data frames received from NETWORK INTERFACE 180 are similarly decoded on arrival before being provided to CPU SYSTEM 140. Because SECURITY DEVICE 100 is performing this operation without the knowledge of CPU SYSTEM 140, it is not possible for CPU SYSTEM 140 to detect, counteract, or otherwise prevent the data payload encoding done by SECURITY DEVICE 100. The encoded data payload can only be decoded by PHYSICAL PRESENCE DEVICE 160, which in this configuration is remotely located with respect to PROTECTED SYSTEM 200. PHYSICAL PRESENCE DEVICE 160 can perform the decoding because it contains CRYPTOGRAPHIC INFORMATION that matches it to SECURITY DEVICE 100. Similarly, any transmission of information from PHYSICAL PRESENCE DEVICE 160 to PROTECTED SYSTEM 200 uses the same encoding/decoding procedure before data is allowed to be received by CPU SYSTEM 140.

Figure 5:
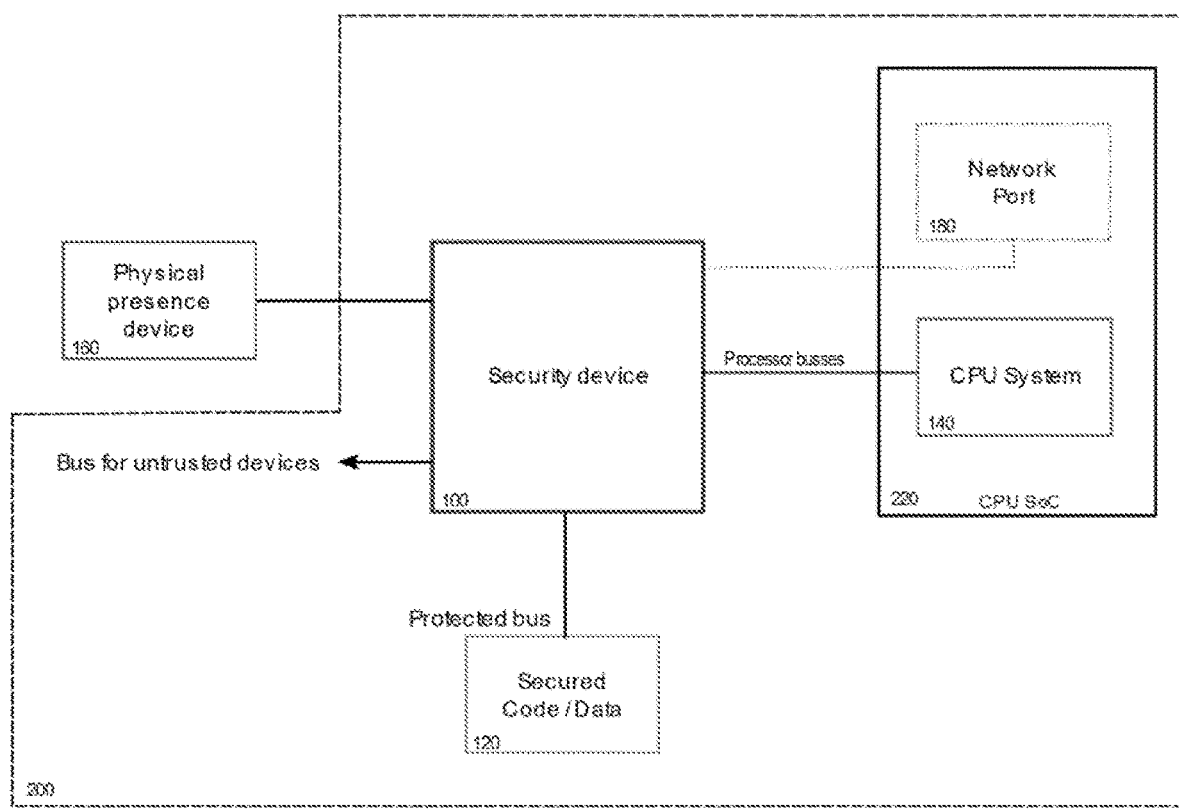
FIG. 5 is a drawing of the system explicitly showing network connectivity when the network interface is integrated into the CPU system.

In some cases, CPU SYSTEM 140 may contain a network port as shown in FIG. 5. In this case, both CPU SYSTEM 140 and network port 180 are contained within the same system-on-a-chip shown as CPU SOC 220. SECURITY DEVICE 100 performs the same encoding and decoding operations, and communicates only with its matched, remotely located PHYSICAL PRESENCE DEVICE 160 as before. Unlike FIG. 4, however, SECURITY DEVICE 100 passes information through the CPU SOC rather than an explicit connection to the external network port. The overall result is the same, but the electrical connection is slightly different to account for the different configuration of the CPU SOC.

Other Embodiments

As will also be apparent to those skilled in the art, there are alternate embodiments of the architecture including implementation with more than one PHYSICAL PRESENCE DEVICE. In that embodiment, the PROGRAMMER 180 in FIG. 3 is used to program a single instance of PROTECTED SYSTEM 200 as well as two or more PHYSICAL PRESENCE DEVICEs 160. The electrical circuits on each PHYSICAL PRESENCE DEVICE are not necessarily identical, and are used for providing (possibly) differing levels of access to SECURITY DEVICE 100, or for providing multiple secure point-to-point communication channels. This embodiment retains all the features and benefits of a system with a single PHYSICAL PRESENCE DEVICE.

Another embodiment apparent to those skilled in the art is an implementation in which the PHYSICAL PRESENCE DEVICE is electrically removable but not physically removable from the PROTECTED SYSTEM. Such an implementation is made by providing a mechanism for breaking the electrical connection between the PHYSICAL PRESENCE DEVICE and the PROTECTED SYSTEM. Mechanisms include, but are not limited to, using an implementation of an electronic switch or relay to electrically disconnect the PHYSICAL PRESENCE DEVICE. For example, a PROTECTED SYSTEM containing a fingerprint sensor uses the sensor to connect or disconnect the PHYSICAL PRESENCE DEVICE based on validation of an authorized fingerprint. This type of system provides a system logging capability to monitor privileged access to the SECURITY DEVICE.

Also apparent to those skilled in the art is an implementation in which the mechanism of programming the system varies, since there are many obvious ways in which the CRYPTOGRAPHIC INFORMATION can be generated and stored. A key feature of the system is the storage of the CRYPTOGRAPHIC INFORMATION on a per-instance basis and not the specific use of a PROGRAMMER to do so. As such, any implementation of the programming function using software, hardware, or any other technique for generating and storing the CRYPTOGRAPHIC INFORMATION may be substituted without exceeding the scope of this invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A security system for embedded systems, comprising:
   an embedded system with a central processor unit (CPU) SYSTEM, the CPU SYSTEM comprising one or more microprocessor cores and running dedicated CODE, the CODE comprising machine-language instructions controlling actions of the microprocessor cores of the CPU SYSTEM;
   a SECURITY DEVICE being an electronic integrated circuit (IC) separate from the CPU SYSTEM, where the IC is not and does not use any general purpose microprocessors nor any microprocessor cores of the CPU SYSTEM, wherein the SECURITY DEVICE is irremovably connected to the CPU SYSTEM as part of a PROTECTED SYSTEM;
   a PHYSICAL PRESENCE DEVICE (PPD) being an electrical circuit connectable to the PROTECTED SYSTEM;
   a PROGRAMMER connected to the PPD and the SECURITY DEVICE during construction of the PROTECTED SYSTEM and disconnected during operation of the PROTECTED SYSTEM, wherein the PROGRAMMER is an electrical circuit or collection of circuits which generates CRYPTOGRAPHIC INFORMATION for the PPD and the SECURITY DEVICE;
   a protected storage electrically connected to the SECURITY DEVICE;
   wherein the CRYPTOGRAPHIC INFORMATION, received from the PROGRAMMER during construction of the PROTECTED SYSTEM and stored on the PPD and the SECURITY DEVICE, is unique to both the PPD and the SECURITY DEVICE such that other PROTECTED SYSTEMS cannot share the same PPD; and
   wherein when the PPD is physically connected to the SECURITY DEVICE after construction and validated based on the CRYPTOGRAPHIC INFORMATION, electrical circuits within the PPD enable one or more functions within the SECURITY DEVICE to:
   encrypt and load CODE or other data into the protected storage;
   modify a state of the SECURITY DEVICE; or
   synchronize the CRYPTOGRAPHIC INFORMATION on either the PPD or the SECURITY DEVICE.

2. The security system of claim 1, wherein all devices which ordinarily would connect to the CPU SYSTEM via one or more system busses instead are connected to the SECURITY DEVICE such that the SECURITY DEVICE monitors all device interfaces with the CPU SYSTEM.

3. The security system of claim 2, wherein the SECURITY DEVICE includes electrical circuitry to service all requests for CODE execution when CODE is contained in the protected storage, and process all requests for CODE not contained in the protected storage as invalid requests which are prevented from being functional instructions on the CPU SYSTEM.

4. The security system of claim 1, wherein the SECURITY DEVICE is electrically connected to CPU SYSTEM via standard system interfaces and monitors electronic activity on the interfaces.

5. The security system of claim 1, wherein the PPD further includes electrical circuitry for an interface to a communication network such that a secure communication channel to the CPU SYSTEM can be established across the communication network between the PPD and the SECURITY DEVICE by encoding and decoding communications across the secure communication channel based on the CRYPTOGRAPHIC INFORMATION.

6. The security system of claim 5, further comprising one or more additional PPDs connected to the PROGRAMMER during construction of the PROTECTED SYSTEM, the one or more additional PPDs storing CRYPTOGRAPHIC INFORMATION and including electrical circuitry for interfacing with the communication network to establish additional secure communication channels across the communication network to each of the additional PPDs.

7. A method for securing embedded systems, comprising:
   constructing a PROTECTED SYSTEM which irremovably connects a SECURITY DEVICE to a central processor unit (CPU) SYSTEM, wherein the CPU SYSTEM comprises one or more microprocessor cores and runs dedicated CODE, wherein the CODE comprises machine-language instructions controlling actions of the microprocessor cores of the CPU SYSTEM, wherein the SECURITY DEVICE is an electronic integrated circuit (IC) separate from the CPU SYSTEM, and wherein the IC is not and does not use any general purpose microprocessors nor any microprocessor cores of the CPU SYSTEM;
   storing the CODE within protected storage electrically connected to the SECURITY DEVICE;
   during construction, connecting a PHYSICAL PRESENCE DEVICE (PPD) to the PROTECTED SYSTEM and a PROGRAMMER to the PPD and the SECURITY DEVICE, wherein the PPD and the PROGRAMMER are each an electrical circuit or collection of circuits;
   while connected during construction, generating, by the PROGRAMMER, CRYPTOGRAPHIC INFORMA- TION unique to both the PPD and the SECURITY DEVICE such that other PROTECTED SYSTEMS cannot share the same PPD, and storing the CRYPTOGRAPHIC INFORMATION in the PPD and the SECURITY DEVICE; and physically connecting the PPD to the SECURITY DEVICE after construction, validating the PPD with the SECURITY DEVICE based on the CRYPTOGRAPHIC INFORMATION, and enabling functions within the SECURITY DEVICE based on electrical circuits within the PPD, the functions including one or more of:
- encrypting and loading CODE or other data into the protected storage;
- modifying a state of the SECURITY DEVICE; or
- synchronizing the CRYPTOGRAPHIC INFORMATION on either the PPD or the SECURITY DEVICE.

8. The method of claim 7, further comprising monitoring, by the SECURITY DEVICE, all device interfaces with the CPU SYSTEM by connecting all devices through the SECURITY DEVICE to the CPU SYSTEM instead of directly connecting to one or more system busses of the CPU SYSTEM.

9. The method of claim 8, further comprising servicing, by the SECURITY DEVICE, all requests for CODE execution when CODE is contained in the protected storage, and preventing, by the SECURITY DEVICE, any execution by the CPU SYSTEM of CODE not stored in the protected storage by treating any such requests as invalid requests.

10. The method of claim 7, further comprising electrically connecting the SECURITY DEVICE to the CPU SYSTEM via standard system interfaces and monitoring, by the SECURITY DEVICE, electronic activity on the standard system interfaces.

11. The method of claim 7, further comprising:
- connecting the PPD to a communication network through an interface with electrical circuitry included within the PPD;
- establishing a secure communication channel to the CPU SYSTEM across the communication network between the PPD and the SECURITY DEVICE; and
- encoding and decoding communications across the communication channel based on the CRYPTOGRAPHIC INFORMATION stored in the PPD and the SECURITY DEVICE.

12. The method of claim 11, further comprising:
- connecting one or more additional PPDs to the PROGRAMMER during construction of the PROTECTED SYSTEM and storing the CRYPTOGRPAHIC INFORMATION on the one or more additional PPDs;
- connecting the one or more additional PPDs to the communication network; and
- establishing additional secure communication channels across the communication network between the SECURITY DEVICE and each of the one or more additional PPDs.

13. A security system for embedded systems, comprising:
an embedded system with a central processor unit (CPU) SYSTEM, the CPU SYSTEM comprising one or more microprocessor cores and running dedicated CODE, the CODE comprising machine-language instructions controlling actions of the microprocessor cores of the CPU SYSTEM;
a SECURITY DEVICE being an electronic integrated circuit (IC) separate from the CPU SYSTEM, where the IC is not and does not use any general purpose microprocessors nor any microprocessor cores of the CPU SYSTEM, wherein the SECURITY DEVICE is irremovably connected to the CPU SYSTEM as part of a PROTECTED SYSTEM;
a protected storage electrically connected to the SECURITY DEVICE;
a PHYSICAL PRESENCE DEVICE (PPD) being an electrical circuit connectable to the PROTECTED SYSTEM;
a PROGRAMMER connected to the PPD and the SECURITY DEVICE during construction of the PROTECTED SYSTEM and disconnected during operation of the PROTECTED SYSTEM, wherein the PROGRAMMER is an electrical circuit or collection of circuits which generates CRYPTOGRAPHIC INFORMATION for the PPD and the SECURITY DEVICE;
the CRYPTOGRAPHIC INFORMATION received from the PROGRAMMER during construction of the PROTECTED SYSTEM and stored on the PPD and the SECURITY DEVICE, wherein the CRYPTOGRAPHIC INFORMATION is unique to both the PPD and the SECURITY DEVICE such that other PROTECTED SYSTEMS cannot share the same PPD;
wherein when the PPD is physically connected to the SECURITY DEVICE after construction and validated based on the CRYPTOGRAPHIC INFORMATION, electrical circuits within the PPD enable one or more functions within the SECURITY DEVICE to:
- encrypt and load CODE or other data into the protected storage,
- modify a state of the SECURITY DEVICE, or
- synchronize the CRYPTOGRAPHIC INFORMATION on either the PPD or the SECURITY DEVICE;

wherein the SECURITY DEVICE is electrically connected to CPU SYSTEM via standard system interfaces and monitors electronic activity on the interfaces;
wherein all devices which ordinarily would connect to the CPU SYSTEM via one or more system busses instead are connected to the SECURITY DEVICE such that the SECURITY DEVICE monitors all device interfaces with the CPU SYSTEM;
wherein the SECURITY DEVICE includes electrical circuitry to service all requests for CODE execution when CODE is contained in the protected storage, and process all requests for CODE not contained in the protected storage as invalid requests which are prevented from being functional instructions on the CPU SYSTEM;
wherein the PPD further includes electrical circuitry for an interface to a communication network such that a secure communication channel to the CPU SYSTEM can be established across the communication network between the PPD and the SECURITY DEVICE by encoding and decoding communications across the secure communication channel based on the CRYPTOGRAPHIC INFORMATION; and
one or more additional PPDs connected to the PROGRAMMER during construction of the PROTECTED SYSTEM, the one or more additional PPDs storing CRYPTOGRAPHIC INFORMATION and including electrical circuitry for interfacing with the communication network to establish additional secure communication channels across the communication network to each of the additional PPDs.

* * * * *